United States Patent
Ahrens et al.

(10) Patent No.: US 10,436,362 B2
(45) Date of Patent: Oct. 8, 2019

(54) CLAMP ASSEMBLY

(71) Applicant: McElroy Manufacturing, Inc., Tulsa, OK (US)

(72) Inventors: Seth P. Ahrens, Tulsa, OK (US); Brian M. O'Connell, Sand Springs, OK (US)

(73) Assignee: McElroy Manufacturing, Inc., Tulsa, OK (US)

( * ) Notice: Subject to any disclaimer, the term of this patent is extended or adjusted under 35 U.S.C. 154(b) by 205 days.

(21) Appl. No.: 15/709,462

(22) Filed: Sep. 19, 2017

(65) Prior Publication Data
US 2019/0086007 A1 Mar. 21, 2019

(51) Int. Cl.
| F16L 23/06 | (2006.01) |
| F16B 2/10 | (2006.01) |
| F16B 2/14 | (2006.01) |
| F16B 2/18 | (2006.01) |
| E05D 7/10 | (2006.01) |
| B65D 45/34 | (2006.01) |

(52) U.S. Cl.
CPC ............. *F16L 23/06* (2013.01); *F16B 2/10* (2013.01); *F16B 2/14* (2013.01); *B65D 45/345* (2013.01); *E05D 7/1066* (2013.01); *F16B 2/185* (2013.01)

(58) Field of Classification Search
CPC ............... F16L 23/06; F16B 2/10; F16B 2/14
See application file for complete search history.

(56) References Cited

U.S. PATENT DOCUMENTS

| 2,257,962 A | 10/1941 | Kemper | |
| 9,890,884 B1* | 2/2018 | Chiproot | F16L 21/005 |
| 2009/0194994 A1* | 8/2009 | Weinhold | F16L 23/06 |
| | | | 285/365 |
| 2010/0207385 A1* | 8/2010 | Nishimura | F16B 2/10 |
| | | | 285/364 |

(Continued)

FOREIGN PATENT DOCUMENTS

| GB | 2125506 A | 3/1984 |
| GB | 2239917 A | 7/1991 |

OTHER PUBLICATIONS

International Search Report prepared by the European Patent Office dated Dec. 17, 2018 for PCT/US2018/050420.

*Primary Examiner* — James M Hewitt, II
(74) *Attorney, Agent, or Firm* — Scott R. Zingerman; Gable Gotwals

(57) ABSTRACT

Assembly for securing two components by tool free engagement. The assembly including a clamped component and a shouldered component. The shouldered component including a channel for receiving the clamped component. The channel having a first wall and a second wall. The clamped component being in contact with the second wall. The first wall of the channel having a tapered interface. A clamp including a clamp segment having a tapered interface, is adapted to wedge against the tapered interface of the first wall. The clamp segment being positioned between the first wall and the clamped component. Application of clamping force by the clamp on the clamp segment forces its tapered interface against the mating tapered interface of the first wall resulting in a force which translates from the clamp segment through the clamped component and against the second wall of the channel thereby securing the clamped component to the shouldered component.

20 Claims, 7 Drawing Sheets

(56) References Cited

U.S. PATENT DOCUMENTS

2012/0326440 A1* 12/2012 Weinhold .............. F16L 3/1222
                                                        285/374
2014/0333068 A1* 11/2014 Ikushima ................. F16B 2/10
                                                        285/409

* cited by examiner

CLAMP ASSEMBLY

FIELD OF THE INVENTION

The present invention relates to assemblies for securing two mechanical components together generally and specifically to such assemblies which apply a clamping force.

BACKGROUND OF THE INVENTION

It is commonly necessary to rigidly secure two mechanical components together. However, rigid attachment, particularly where the two mechanical components are operable to move together, such as rotate about a central axis, typically requires a connection system that includes fasteners. Connecting and disconnecting the fasteners to secure and separate the two components most often requires tools of some sort. When frequent and/or rapid connections and disconnections between the components are desired or required, the tools often pose a time and labor delay. A need, therefore, exists for an apparatus for tool free connecting and disconnecting of two mechanical components.

SUMMARY OF THE INVENTION

The present disclosure includes an assembly for securing two components together by tool free engagement. The assembly includes a clamped component and a shouldered component. The shouldered component may be comprised of one or more element. The shouldered component has a first wall and a second wall. The clamped component is in contact with the second wall and adapted to transfer force to the second wall. The first wall of the channel has a tapered interface. A clamp adapted to exert a clamping force, includes a clamp segment having a tapered interface. The tapered interface is adapted to wedge against the tapered interface of the first wall and adapted for receiving the clamping force from the clamp and transfer that force against the tapered interface of the first wall. The clamp segment is positioned between the first wall and the clamped component and adapted for transferring force to the clamped component. A channel is defined between the first wall and second wall for receiving the clamped component.

Application of clamping force by the clamp on the clamp segment forces its tapered interface against the mating tapered interface of the first wall. This results in a force which translates from the clamp segment through the clamped component and against the second wall of the channel thereby securing the clamped component to the shouldered component. The clamp is adapted to exert a force sufficient to secure the clamped component and the shouldered component in the channel. The shouldered component may be comprised of two elements together forming the channel defined between the first wall and the second wall.

The tapered interface of the clamp segment mates the tapered interface of the first wall. The mating taper comprises an angle.

The clamp segment may be at least partially arcuate and the channel may be at least partially arcuate. The clamp may also include a plurality of clamp segments each having a tapered interface.

In a specific embodiment, the clamp includes two clamp segments. The two clamp segments of the clamp may be at least partially arcuate matching an arcuate geometry of the channel.

In one embodiment, the two clamp segments each include a first end and a second end with a pivot link securing the second end of the two clamp segments together. A latch may secure the first end of the two clamp segments together. In a particular embodiment, the latch is an over center latch which may include a clamp handle for tool free manipulation of the clamp.

In an alternate embodiment, a compressible member may be positioned between the clamp segment and the clamped component.

In an alternate embodiment, the assembly for securing two components by tool free engagement includes a clamped component. It also includes a first shouldered component having a first wall and a second shouldered component having a second wall. The first shouldered component and the second shouldered component may be secured (either to each other or to another or other components) such that the first shouldered component and the second shouldered component together include a channel for receiving the clamped component. The clamped component is in contact with the second wall and adapted to transfer force to the second wall. The first wall of the channel has a tapered interface.

The alternate assembly includes a clamp adapted to exert a clamping force. The clamp includes two clamp segments each having a tapered interface which is adapted to wedge against the tapered interface of the first wall. The taper interface being further adapted for receiving the clamping force from the clamp and for transferring that force against the tapered interface of the first wall. The clamp segments are positioned between the first wall and the clamped component and adapted for transferring force to the clamped component. Application of clamping force by the clamp on the clamp segments forces their respective tapered interface against the mating tapered interface of the first wall resulting in a force which translates from the clamp segment through the clamped component and against the second wall of the channel thereby securing the clamped component to the shouldered component.

The two clamp segments may each include a first end and a second end with a pivot link securing the second end of the two clamp segments together. A latch may be adapted so as to secure the first end of the two clamp segments together. In one embodiment the latch is an over center (or cam over) latch.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

DETAILED DESCRIPTION OF THE PREFERRED EMBODIMENTS

The present disclosure includes an assembly for securing two components together by tool free engagement. In a preferred arrangement the two components are mechanical components. The clamp apparatus of the present disclosure could be employed wherever there is a need for a rigid connection between the two components. The clamp apparatus is particularly applicable where there exists a need to frequently or quickly separate the two mechanical components such as for portability or rapid set-up/take-down and wherein the use of a connection system commonly requires the use of hand tools to loosen or tighten the connection.

Figure 1:
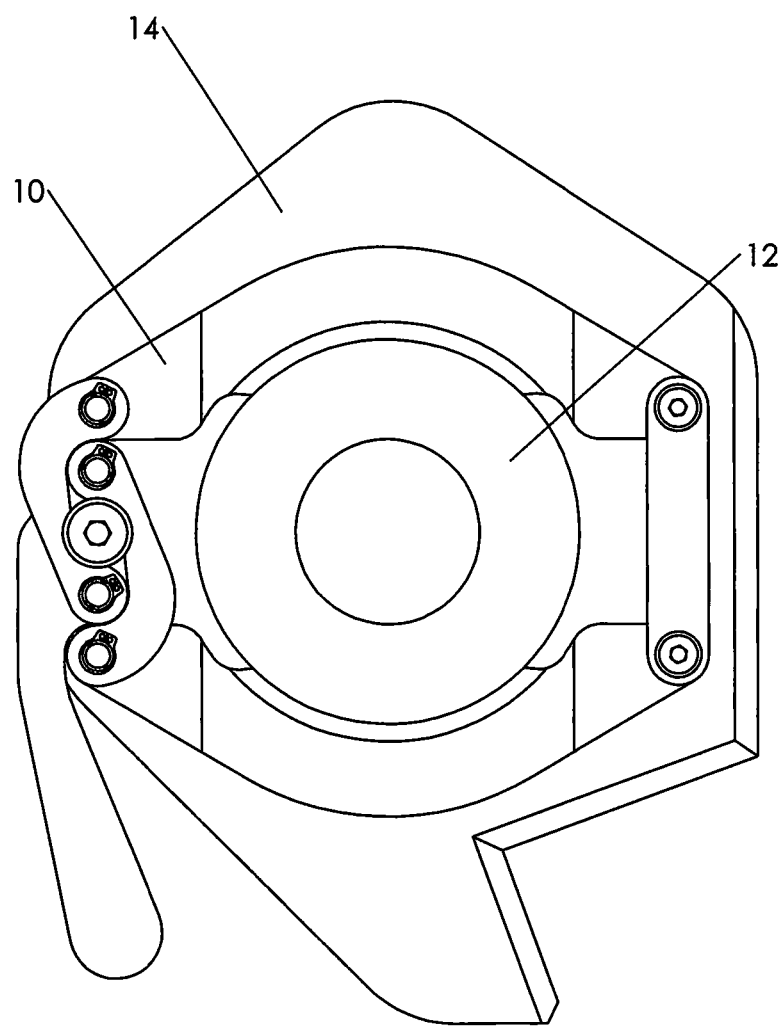
FIG. 1 is a front view of the clamp assembly of the present disclosure depicted as securing two mechanical components together by tool free engagement.
Figure 2:
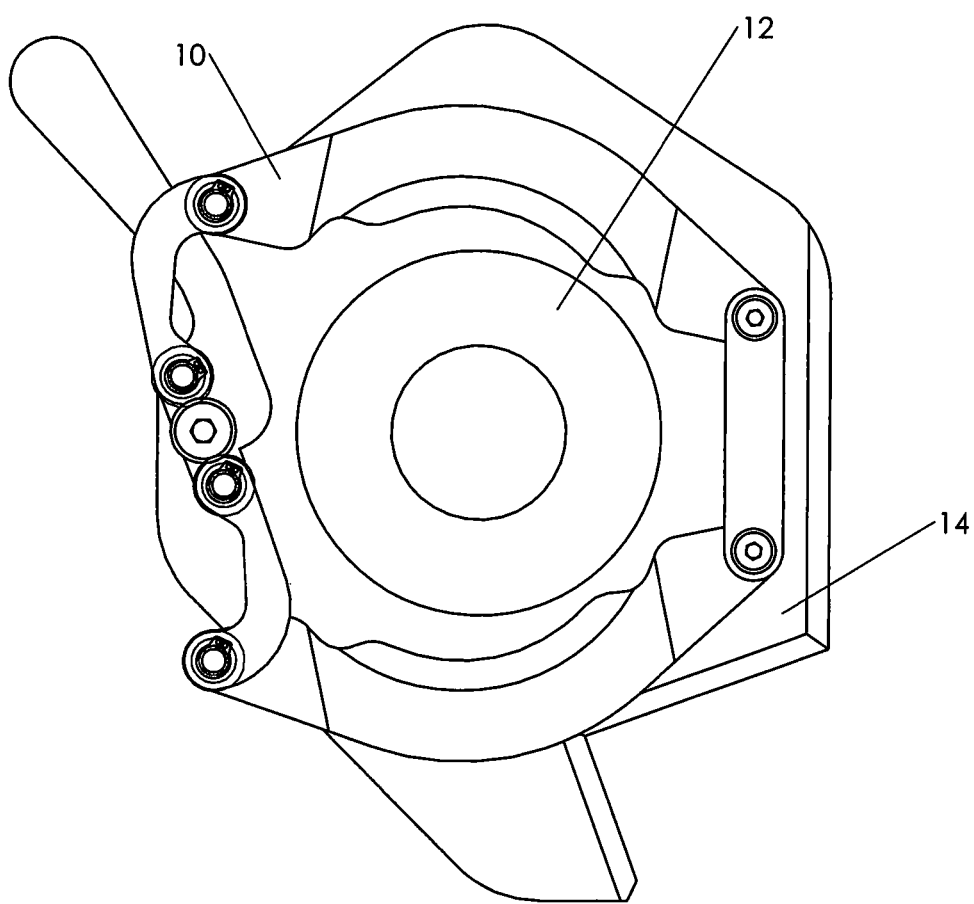
FIG. 2 is the clamp assembly of FIG. 1 depicted with the clamp unlocked with the clamp segments retracted so as to allow tool free separation of the two mechanical components.

FIG. 1 depicts one embodiment employing the clamp apparatus of the present disclosure. FIG. 1 depicts the clamp apparatus of the present disclosure 10 employed to rigidly secure a first mechanical component 12 to/onto a second mechanical component 14. FIG. 1 depicts the clamp apparatus 10 in a locked or secured position. FIG. 2 depicts the clamp apparatus 10 in an unlocked or open orientation.

Figure 3:
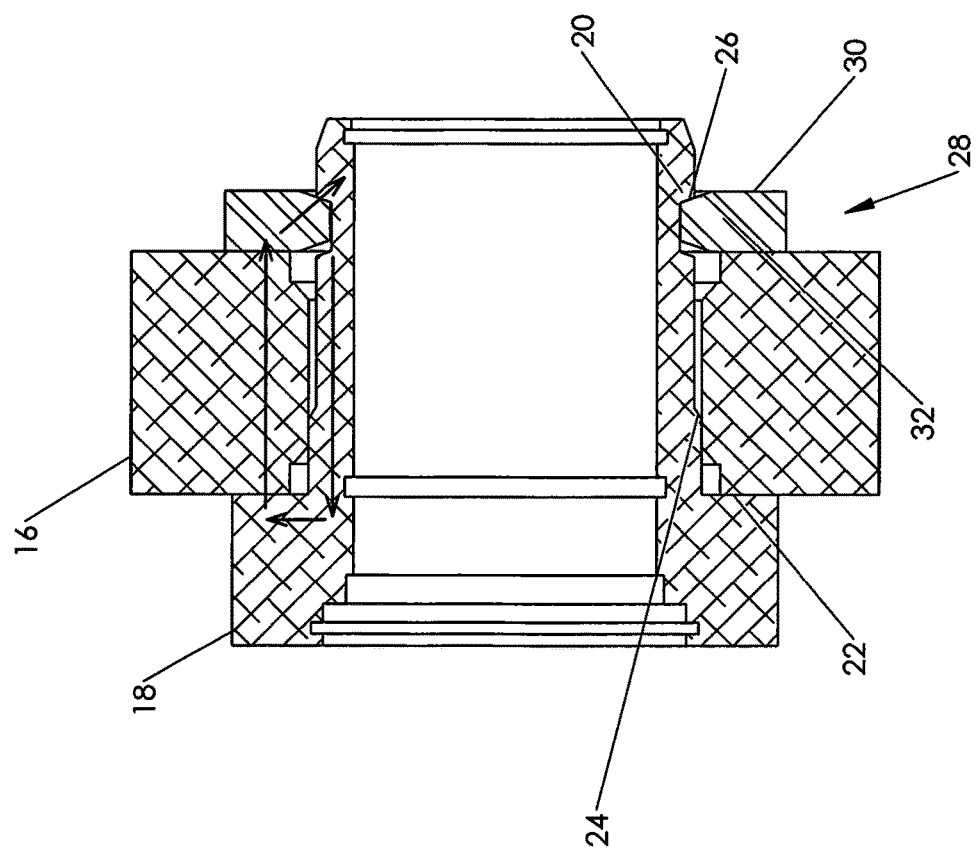
FIG. 3 is a cross-sectional view of a clamp assembly of the present disclosure depicted as securing an exemplary clamped component to an exemplary shouldered component.
Figure 4:
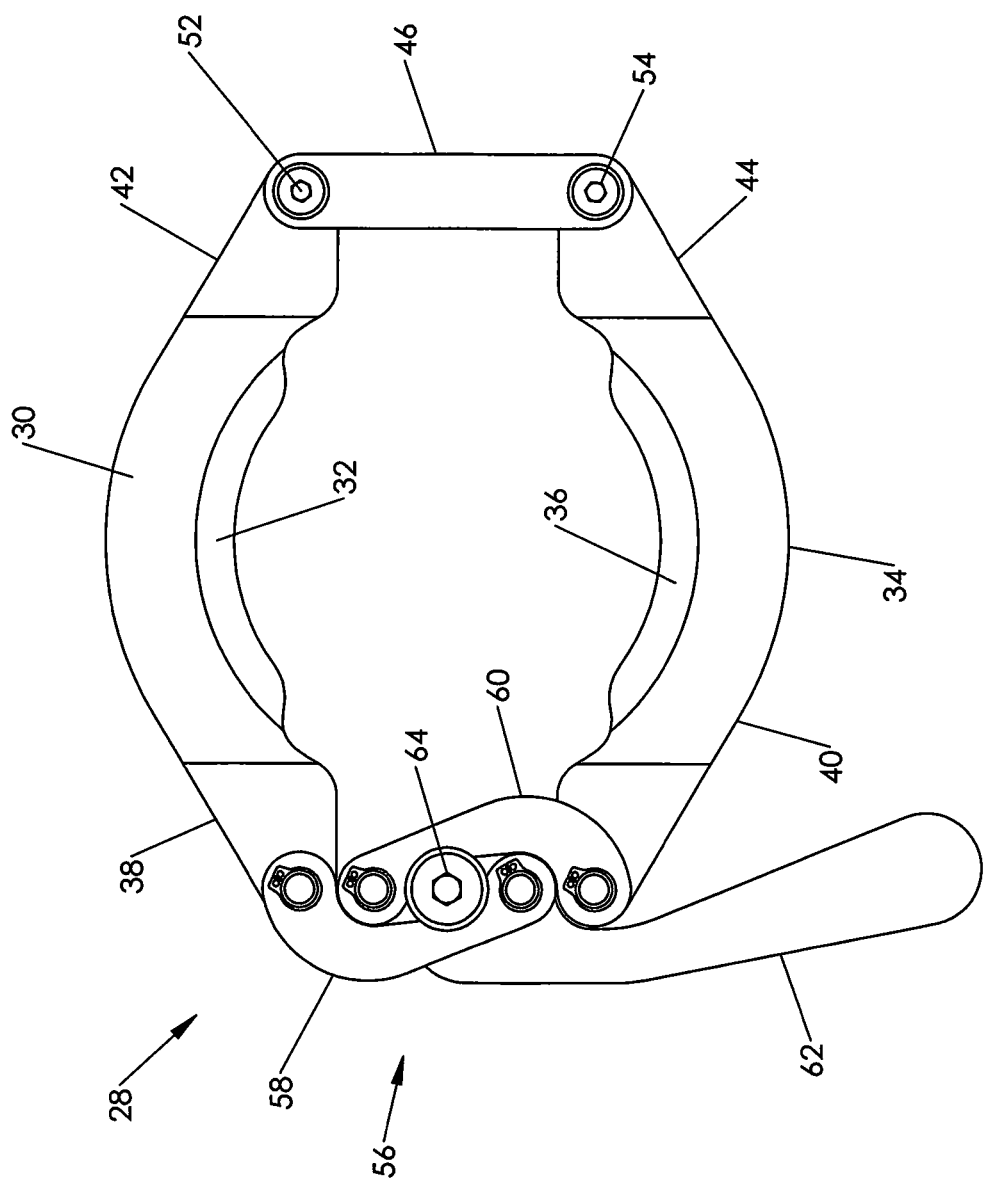
FIG. 4 is a front view of the clamp of the present disclosure depicted in the closed or locked position.
Figure 5:
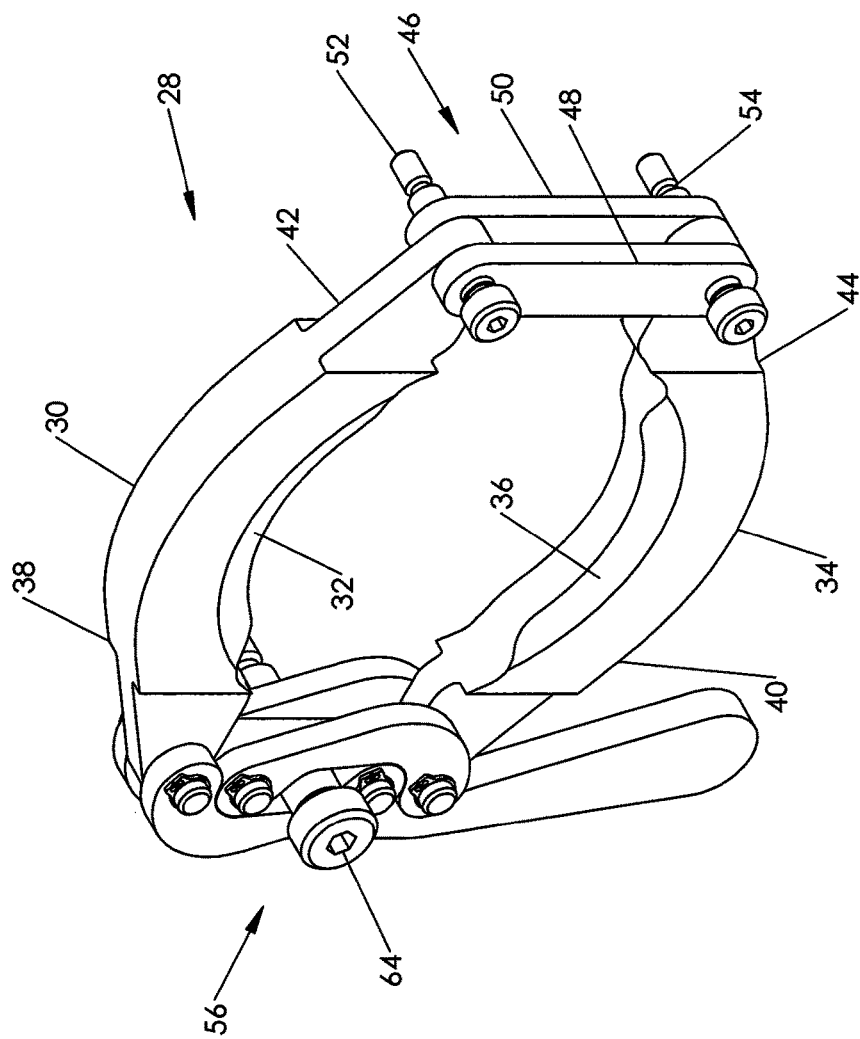
FIG. 5 is an isometric view of the clamp of FIG. 4.
Figure 6:
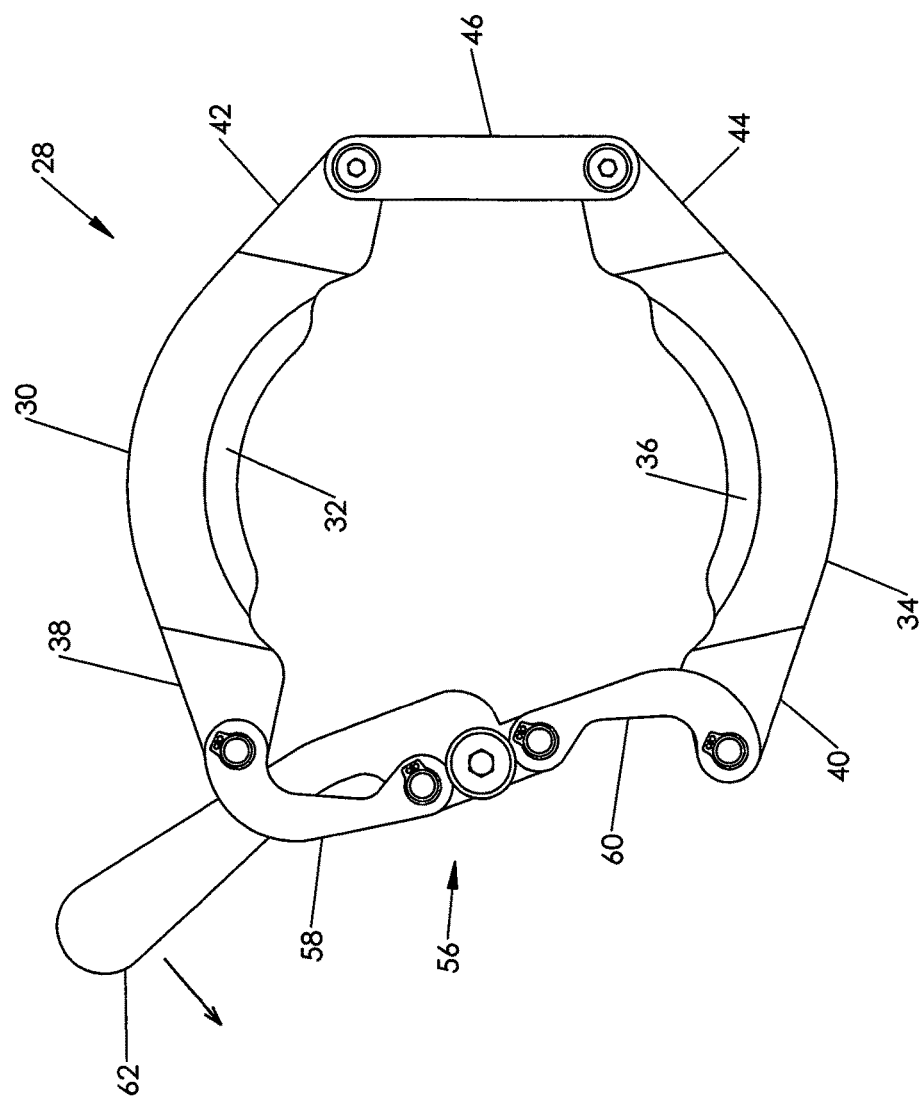
FIG. 6 is a front view of the clamp of the present disclosure depicted in the open or unlocked position.

With reference next to FIG. 3 taken in combination with FIGS. 4-6, one embodiment of the clamp apparatus shall be described. FIG. 3 is a cut-away view of an exemplary application of the clamp apparatus of the present disclosure. The two components which are to be connected include a clamped component 16 and a shouldered component 18. Shouldered component 18 includes in a basic embodiment a first wall 20 and a second wall 22. A channel 24 is defined between first wall 20 and second wall 22 for receiving clamped component 16. The term "channel" in the context of the present disclosure shall mean the space provided between the first wall including the tapered segment and the second wall against which the clamped component or an inserted additional component is forced and rigidly retained. It should be understood that the channel does not have to be formed in or by a single member shouldered component and is not required to be bounded except with respect to the first wall and the second wall.

The arrows in FIG. 3 depict the load path from clamp segment 28, through shouldered component 18, transferred from shouldered component 18 through first wall 22; and through clamped component 16 back to clamp segment 28.

As depicted in FIG. 3, clamped component 16 is in contact with second wall 22 and adapted to transfer force to second wall 22. First wall 20 includes a tapered interface 26. A clamp 28 is adapted to exert a clamping force.

With specific reference to FIGS. 4-6, an exemplary clamp shall be next described. Clamp 28 includes a clamp segment 30 having a tapered interface 32. Tapered interface 32 is adapted to wedge against the tapered interface 26 of first wall 20.

In the depicted embodiment, two clamp segments 30 and 32 are shown. As depicted, clamp segments 30 and 34 each include a tapered segment 32 and 36, respectively. It should be understood, however, that in other embodiments, only clamp segment 30 may include tapered segment 32 which mates with a tapered segment 26 of first wall 20. In such embodiments clamp segment 34 may not have a taper. Additionally, it is contemplated that clamp 28 could be embodied to include a plurality of clamp segments as may be required.

Clamp 28 in the present embodiment includes clamp segments 30 and 34 including their respective tapered segments 32 and 36.

Clamp segments 30 and 34 may be at least partially arcuate in embodiments where a clamped component 16 is to be secured to an arcuate shouldered component 18 such as when shouldered component 18 is an output shaft or if clamped component 16 is to be secured on a cylindrical rod. In such applications of the clamp assembly of the present disclosure, channel 24 may be also at least partially arcuate with an arc that matches the arc of clamp segments 30 and 34 wherein clamp 28 includes two clamp segments.

As stated, tapered surface 32 of clamp segment 30 is adapted to wedge against the tapered surface 26 of first wall 20. Clamp segment 30 is adapted for receiving a clamping force exerted by clamp 28 and transfer that force against the tapered interface of first wall 20. Clamp segment 30 is positioned between first wall 20 and clamped component 16 and adapted for transferring force to the clamped component 16.

As stated, the tapered interfaces 32 and 36 of clamp segments 30 and 34 mate the tapered interface of first wall 20. In one embodiment, the mating taper comprises an angle which is between about 15° and about 30°. In a second embodiment, the mating taper comprises an angle which is between about 20° and about 26°. In a specific embodiment, the mating taper comprises an angle of about 20°.

In the present embodiment, two clamp segments 30 and 34 each include a first end 38 and 40, respectively, and a second end 42 and 44 respectively. A pivot link 46 may be employed to secure second ends 42 and 44 of clamp segments 30 and 34 together.

With specific reference to FIGS. 5 and 6, in one embodiment, pivot link 46 may include two links 48 and 50 fastened one on each side of and extending between second ends 42 and 44. Links 48 and 50 may be fastened with pivot pins 52 and 54 (such as bolts) such that clamp segments 30 and 34 can pivot to thereby expand the area between clamp segments 30 and 34 (FIG. 6). This expansion allows clamp 28 to unlock and release the clamped components as depicted in FIG. 2.

It is should be understood, however, that in certain embodiments pivot link 46 may alternately include a single link. In other embodiments, pivot link would be eliminated altogether such that second ends 42 and 44 are secured directly together by one or more pivot pins.

A latch 56 secures first ends 38 and 40 of two clamp segments 30 and 34 together. Latch 56 preferably secures to first ends 38 and 40 and allows clamp segments 30 and 34 to be separated while yet remaining attached to first ends 38 and 40. An over center latch has been found to be particularly suitable.

Over center latch 56, known in the art, and also known as a cam over latch is particularly suitable for the present embodiment because it provides a suitable clamping force. In addition, over center latch assemblies allow for a tight, rigid attachment due to their ability to clamp tighter when subject to reverse forces such as could be asserted against clamp segments 30 and 34.

As depicted in FIGS. 4-6 and particularly FIG. 6, first ends 38 and 40 of clamp segments 30 and 34 are respectively pivotally secured to first and second cam arms 58 and 60. Cam arms 58 and 60 are, in turn, pivotally secured to a handle 62. Handle 62 acts as a lever such that rotation of lever 62 pivots cam arms 58 and 60 over each other in the closed or clamped position (FIG. 4). Handle 62 pivots around a central pivot point over and against which cam arms 58 and 60 are rotated (or "cammed"). As a result, a secure lock is achieved. Forces exerted against clamp segments 30 and 34 to push segments 30 and 34 apart are transferred to latch 56, the design of which, causes cam arms 58 and 60 to further rotate so as to clamp segments 30 and 34 even tighter. Clamp 28 and latch 56 are dimensioned so as to provide a clamping force suitable to rigidly secure clamped component 16 and shouldered component 18 together.

Handle 62 acts as a lever as described above. As a result, handle 62 can be dimensioned to engage and disengage latch 56 without the requirement of any tools. Latch 56 can be engaged and disengaged quickly and tool free so that clamped component 16 and shouldered component 18 can be rigidly secured and separated easily and tool free.

Application of clamping force by clamp 56 on clamp segments 30 and 34 forces tapered interfaces 32 and 36 against the mating tapered interface 26 of first wall 20. Application of increasing clamping force wedges the mating tapered surfaces resulting in a force which translates from clamp segments 30 and 34 through clamped component 16 and against second wall 22 thereby securing clamped component 16 to shouldered component 18. Clamp 56 is adapted to exert a force sufficient to rigidly secure clamped component 16 and shouldered component 18 together.

In one alternate embodiment, a compressible member 70 may be positioned between clamp segments 30 and 34 and clamped component 16. Compressible member 70 may be comprised of a rubber or suitable polymer material. Compressible member 70 receives force transferred by clamp segments 30 and 34 and compresses against clamped component 16.

Figure 7:
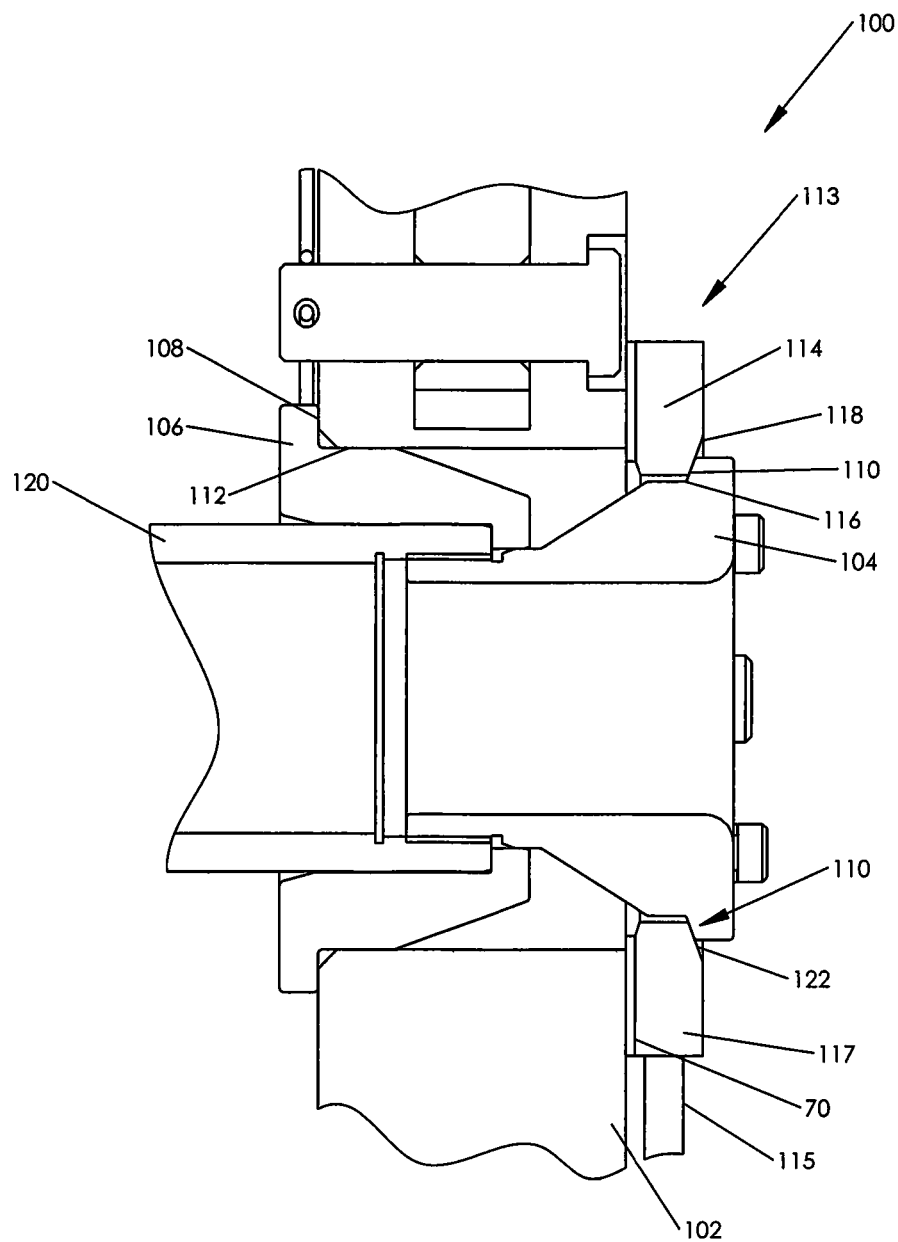
FIG. 7 is a cut-away view of an alternate embodiment of the clamp assembly of the present disclosure including a two-piece shoulder component.

With reference to FIG. 7, in an alternate embodiment, the assembly 100 for securing two components by tool free engagement of the present disclosure includes a clamped component 102. Alternate embodiment 100 includes a first shouldered component 104 having a first wall 110 and a second shouldered component 106 having a second wall 108. The first shouldered component 104 and the second shouldered component 106 may be secured together or by an additional element such as cylindrical rod 110 in the manner shown. First shouldered component 104 and second shouldered component 106 together define a channel 112 for receiving clamped component 102. Clamped component 102 is in contact with second wall 108 and adapted to transfer force to second wall 108. First wall 110 includes a tapered surface 116 which mates the taper of tapered surface 118 of a clamping segments 114 and 117. Clamp 113 is configured in the same manner as discussed above with regard to clamp 28 of FIGS. 4-6.

Assembly 100 includes a clamp 113 adapted to exert a clamping force upon shouldered component 104. Clamp 113 includes two clamp segments 114 and 117 each having a tapered interface 118 and 122 which is adapted to wedge against the tapered interface of first wall 110. Tapered interfaces 118 and 122 further are adapted for receiving a clamping force exerted by clamp 113 and for transferring that force against tapered interface 116 of the first wall 110.

Clamp segments 114 and 117 are positioned between first wall 110 and clamped component 102 and are adapted for transferring force from clamp 113 to clamped component 102. Application of clamping force by clamp 113 on clamp segments 114 and 117 forces their respective tapered interface 118 and 122 against the mating tapered interface 116 of first wall 110. This results in a force which translates from clamp segments 118 and 122, through clamped component 102, and against second wall 108 thereby securing clamped component 102 to shouldered components 104 and 106 within channel 112.

The embodiments herein and the various features and advantageous details thereof are explained more fully with reference to the non-limiting embodiments that are illustrated in the accompanying drawings and detailed in the following description. Descriptions of well-known components and processes and manufacturing techniques are omitted so as to not unnecessarily obscure the embodiments herein. The examples used herein are intended merely to facilitate an understanding of ways in which the invention herein may be practiced and to further enable those of skill in the art to practice the embodiments herein. Accordingly, the examples should not be construed as limiting the scope of the claimed invention.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)—(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. Assembly for securing two components by tool free engagement, the assembly comprising:
   a clamped component;
   a shouldered component of one or more element, said shouldered component including a first wall and a second wall with a channel defined between said first wall and said second wall; said channel adapted for receiving said clamped component;
   said clamped component being in contact with said second wall and adapted to transfer force to said second wall;
   said first wall of said channel having a tapered interface;
   a clamp adapted to exert a clamping force;
   said clamp including a clamp segment having a tapered interface which is adapted to wedge against the tapered interface of said first wall and adapted for receiving the clamping force from said clamp and for transferring the force against the tapered interface of said first wall;
   said clamp segment being positioned between said first wall and said clamped component and adapted for transferring force to said clamped component;
   such that application of clamping force by said clamp on said clamp segment forces its tapered interface against the mating tapered interface of said first wall resulting in a force which translates from said clamp segment through said clamped component and against said second wall of said channel thereby securing said clamped component to said shouldered component; and
   wherein said clamp includes a plurality of segments that pivot with respect to one another.

2. The assembly of claim 1 wherein said shouldered component is comprised of two or more elements which together include said first wall and said second wall forming said channel.

3. The assembly of claim 1 wherein said clamp is adapted to exert a force sufficient to secure said clamped component and said shouldered component in said channel.

4. The assembly of claim 1 wherein said tapered interface of said clamp segment mates the tapered interface of said first wall.

5. The assembly of claim 4 wherein said mating taper comprises an angle between about 15° and about 30°.

6. The assembly of claim 4 wherein said mating taper comprises an angle between about 20° and about 26°.

7. The assembly of claim 4 wherein said mating taper comprises an angle of about 20°.

8. The assembly of claim 1 wherein said clamp segment is at least partially arcuate and said channel is at least partially arcuate.

9. The assembly of claim 1 wherein said clamp segments each having a tapered interface.

10. The assembly of claim 9 including two clamp segments.

11. The assembly of claim 10 wherein said two clamp segments are at least partially arcuate and said channel is at least partially arcuate.

12. The assembly of claim 11 wherein the two clamp segments each include a first end and a second end; a pivot link securing said second end of the two clamp segments together.

13. The assembly of claim 12 further including a latch securing said first end of the two clamp segments together.

14. The assembly of claim 13 wherein said latch is an over center latch.

15. The assembly of claim 14 wherein said over center latch includes a clamp handle.

16. The assembly of claim 1 further including a compressible member positioned between said clamp segment and said clamped component.

17. Assembly for securing two components by tool free engagement, the assembly comprising:
   a clamped component;
   a first shouldered component, said first shouldered component having a first wall;
   a second shouldered component, said second shouldered component having a second wall;
   said first shouldered component and said second shouldered component being secured such that said first shouldered component and said second shouldered component together define a channel for receiving said clamped component;
   said clamped component being in contact with said second wall and adapted to transfer force to said second wall;
   said first wall of said channel having a tapered interface;
   a clamp adapted to exert a clamping force;
   said clamp including two clamp segments each having a tapered interface which is adapted to wedge against the tapered interface of said first wall and adapted for receiving the clamping force from said clamp and for transferring the force against the tapered interface of said first wall;

said clamp segments being positioned between said first wall and said clamped component and adapted for transferring force to said clamped component;

such that application of clamping force by said clamp on said clamp segments forces their respective tapered interface against the mating tapered interface of said first wall resulting in a force which translates from said clamp segment through said clamped component and against said second wall of said channel thereby securing said clamped component to said shouldered component; and wherein said clamp segments pivot with respect to one another.

18. The assembly of claim 17 wherein said tapered interface of said clamp segment mates the tapered interface of said first wall.

19. The assembly of claim 18 wherein said mating taper includes an angle between about 20° and about 26°.

20. The assembly of claim 17 wherein the two clamp segments each include a first end and a second end; a pivot link securing said second end of the two clamp segments together; and, a latch securing said first end of the two clamp segments together.

* * * * *